April 12, 1966            H. PACKARD            3,246,269

SHIELDED MAGNETIC CIRCUIT HAVING DAMPING MEANS

Filed Aug. 29, 1963

INVENTOR.
HENRY PACKARD
BY
ATTORNEYS

United States Patent Office
3,246,269
Patented Apr. 12, 1966

3,246,269
SHIELDED MAGNETIC CIRCUIT HAVING
DAMPING MEANS
Henry Packard, Norwood, Mass., assignor to Northrop Corporation, Beverly Hills, Calif., a corporation of California
Filed Aug. 29, 1963, Ser. No. 305,320
7 Claims. (Cl. 336—30)

This invention relates to a magnetic circuit of such a construction as to be completely shielded from external magnetic fields, which circuit may be used to advantage for damping the movements of an instrument, such as a gyroscope.

Practically all delicate and precision instruments require damping to restrain sudden movement of their members relative to one another, and to avoid excessive oscillation of the members about a null position. Such damping may be obtained through the use of dashpots, springs, friction between the members or between a member and an enveloping fluid, or by employing interacting magnetic fields. This damping must be accurately stabilized for the precision instrument to give an accurate reading, or output. Any variation in the damping force will induce a corresponding variation, or error, in the reading of the instrument.

Where a large damping force is required in a precision instrument, interacting magnetic fields are not commonly used, for, to obtain a large magnetic damping force, correspondingly large magnetic fields are required. These large magnetic fields are difficult to isolate, or shield, from the remainder of the instrument and from external magnetic fields, and tend to induce errors in the output of the instrument. For example, in a rate gyroscope, the large damping magnetic field will tend to interact with the magnetic field of the electric motor driving the gyroscope rotor, and these interacting magnetic fields will tend to vary both the speed of the rotor and the damping force. These variations compound one another to result in appreciable and intolerable errors in the output of the gyroscope. Also, external magnetic fields, such as the earth's magnetic field, tend to interact with the damping magnetic field further compounding the error in the output of the instrument. Since it has not been heretofore possible to effectively shield the damping magnetic field from the remainder of the instrument and from external magnetic fields, magnetic damping of precision instruments is seldom used.

An object of the invention is to improve the shielding of the magnetic circuit from external magnetic fields. Such a magnetic circuit may be used to advantage in precision instruments, such as a rate gyroscope, to exert a damping force on the instrument, and a further object of the invention is to provide such an improved precision instrument. Still another object of the invention is to simplify the magnetic damping circuit. These and further objects will be apparent from the following description of a prepared embodiment of the invention.

The magnetic circuit of the invention includes, among its more important features, basically five members:

(1) A cylindrical magnet axially magnetized;
(2) A first annular magnetically conductive member having a side face abutting one end of the cylindrical magnet;
(3) An outer magnetically conductive cylindrical member longer than the cylindrical magnet and having one end portion adjacent and spaced from the outer periphery of the annular member, to form a gap in the magnetic circuit;
(4) A second annular magnetically conductive member abutting, and preferably attached to, the outer cylindrical member and having a side face abutting the other end of the cylindrical magnet; and
(5) An inner non-magnetic cylindrical sleeve extending through the cylindrical magnet and abutting the adjacent inner peripheries of the annular members.

Preferably field poles are formed on the outer marginal portion of the first annular member; also, the outer cylindrical member extends axially beyond the first annular member; and the inner cylinder clamps the annular members to the cylindrical magnet to hold the assembly together.

With such a magnetic circuit, when a conductive element, preferably cylindrical in shape, is inserted in the gap of the magnetic circuit between the first annular member and the outer cylindrical member, eddy currents and a magnetic field are induced in the conductive element by the magnetic field, and these fields interact to restrain and damp movement of the conductive element relative to the magnetic circuit assembly. This improved magnetic circuit advantageously may be used with such a conductive element to damp movement of a rate gyroscope gimbal, preferably by attaching the magnetic circuit to the outer housing of the gyroscope coaxial with the outer gimbal axis, and the conductive element to the gyroscope gimbal coaxial with the gimbal axis and projecting within the gap of the magnetic circuit.

The improved magnetic circuit will be further described in connection with the accompanying drawing illustrating a preferred embodiment of the magnetic circuit in which.

While the magnetic circuit of the invention is quite useful in damping movements of a rate gyroscope instrument, and is illustrated and described in connection with a rate gyroscope, it is, of course, equally valuable for use in other instruments, and may be so employed to equal advantage.

Figure 1:
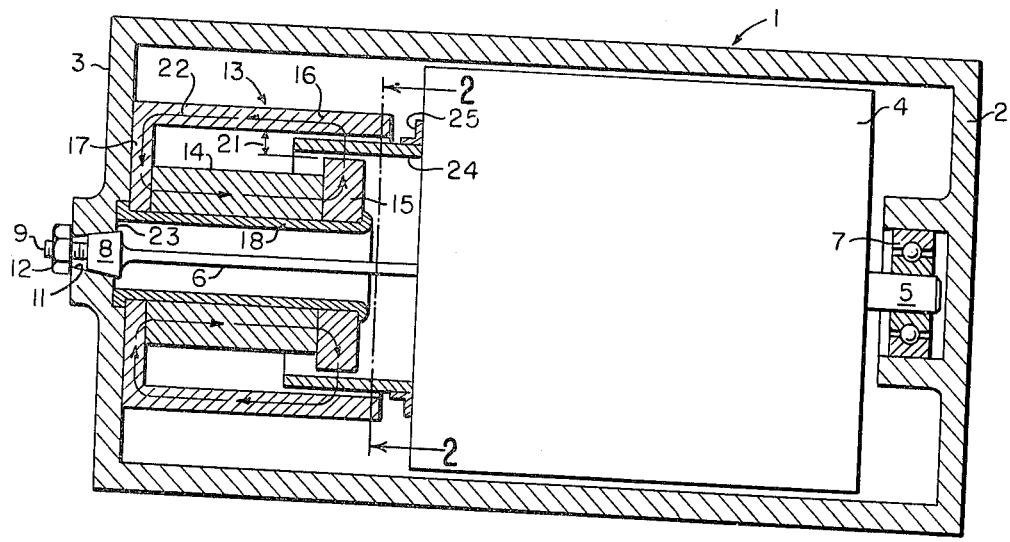
FIG. 1 is a longitudinal cross-sectional view of the improved magnetic circuit in combination with a rate gyroscope.

As illustrated in FIG. 1, the gyroscope and the magnetic circuit damping structure are housed in a cylindrical magnetically conductive casing 1 including end walls 2 and 3 held to the casing in any suitable manner, such as by bolting, brazing, welding, or forming the cylindrical casing and the walls 2 and 3 as a single unitary member. The magnetically conductive casing assists in shielding and isolating the gyroscope and the magnetic circuit from external magnetic fields, and in shielding external instruments from magnetic fields within the casing.

Inasmuch as the rate gyroscope per se forms no part of the present invention, and rate gyroscopes are well known to those skilled in the art, only the outer gimbal 4 of the rate gyroscope is illustrated in FIG. 1. As is common, the outer gimbal of the rate gyroscope is mounted for rotation about its longitudinal axis by a trunnion 5 and a torsion bar 6 extending from opposite ends of the gimbal. The trunnion is supported by, and freely rotates in, a ball bearing 7 supported in the end wall 2. The torsion bar terminates in a conical head 8 from which projects a threaded stud 9. The conical head and the threaded stud of the torsion bar are clamped in a conical opening 11 in the end wall 3 by a nut 12 threaded onto the stud 9. Rotation of the torsion bar 6 relative to the end wall is thus prevented.

The improved magnetic circuit 13 of the invention is fixed in any suitable manner to the casing 1 about the torsion bar 6 and coaxial with the longitudinal axis of the outer gimbal. The magnetic circuit 13 includes an axially magnetized cylindrical magnet 14, which is preferably a permanent magnet of Alnico V. Other suitable materials, or an electromagnet, may of course be employed. About the cylindrical magnet 14 are positioned the other four elements of the preferred magnetic circuit; namely, a first annular member 15, an outer cylindrical member 16, a second annular member 17, and an inner sleeve 18.

Figure 2:
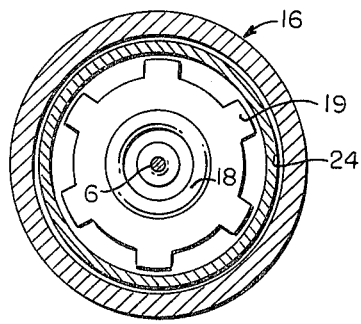
FIG. 2 is a lateral cross-sectional view taken on line 2—2 of FIG. 1.

As shown in FIG. 1, one side face of the first annular member 15 abuts and covers one end of the cylindrical magnet 14. As shown in FIG. 2, outwardly projecting field poles 19 are formed on the outer marginal portion of the first annular member and extend beyond the outer surface of the cylindrical magnet.

The outer cylindrical member 16 surrounds the cylindrical magnet and extends over the first annular member to form magnetic gaps 21 with the field poles 19. The second annular member 17 preferably is formed integrally with the outer cylindrical member 16 as shown. It extends inwardly from adjacent the outer cylindrical member to abut and cover the other end of the cylindrical magnet.

The first annular member, the outer cylindrical member and the second annular member are formed of a magnetically conductive material, such as relay iron, and shunt the magnetic flux of the cylindrical magnet from one side of the magnet through the gap 21 to the other side of the magnet, as indicated in FIG. 1 by arrows 22, forming a magnetic circuit. These members also shield the magnetic gap 21 from external magnetic fields. To this end, preferably the end portion of the outer cylindrical member adjacent the gap 21 extends well beyond the gap, as shown in FIG. 1. By virtue of this arrangement, virtually all magnetic fields, whether external of the casing 1 or internal of the gimbal 4, are shielded from the gap 21. This effectively prevents them from interacting with the magnetic field in the gap 21 to vary the magnetic damping force exerted by this magnetic field.

The inner diameters of the cylindrical magnet and the annular members preferably are equal. Thus, the inner walls of these members form a continuous cylindrical plane, as shown in FIG. 1. The inner sleeve 18 is snugly received within and extends through the cylindrical magnet and the annular members. The end portions of the sleeve are turned outwardly over the outer face sides of the annular members to hold the magnetic circuit members together. Preferably the sleeve 18 is formed of a non-magnetic material, such as brass.

Preferably the cylindrical magnet 14, before being magnetized, is assembled with the first annular member 15, the outer cylindrical member 16, the second annular member 17 and the sleeve 18 into a unitary magnetic circuit. After assembly, the cylindrical magnet may be permanently magnetized axially by a conventional two-pole magnetizing fixture. The magnetic force of the cylindrical magnet tends to securely clamp the magnetically conductive members of the magnetic circuit together.

If the cylindrical magnet was magnetized before assembly of the magnetic circuit, then it would strongly attract the other members of the magnetic circuit to it during the assembly, and it would be difficult to adjust the members of the magnetic circuit relative to one another. By magnetizing the cylindrical magnet 14 after the circuit is assembled, the assembly of the magnetic circuit is simplified considerably. Also, by magnetizing after assembly, the magnet produces more flux than if magnetized individually and then assembled. Alternatively, instead of a cylindrical magnet 14, an electromagnet may be provided. In this event, the winding of the electromagnet may be placed within the space between the outer surface of the inner cylindrical member 14 and the inner surface of the outer cylindrical member 16.

Preferably, the end of sleeve 18 turned outwardly over the second annular member 17 is snugly received within a cylindrical recess 23 formed in the wall 3 about the opening 11 to attach the magnetic circuit 13 to the casing. However, as noted above, the magnetic circuit may be attached to the casing by welding or riveting the annular member 17 to the wall, or by any other convenient means.

A cylindrical, electrically conductive, non-magnetic element 24 of copper for example, is attached to the gyroscope gimbal 4 about and coaxial with the torsion bar 6. This attachment may be accomplished in any suitable manner, as by welding a flange 25 to the gimbal 4 and brazing the conductive element 24 to the flange 25. The conductive element 24 projects outwardly from the gimbal and through the magnetic gaps 21 between the field poles 19 and the adjacent surface of the outer cylindrical member 16. Preferably the conductive element 24 projects well beyond the field poles and into the space between the cylindrical magnet 14 and the outer cylindrical member 16, as shown in FIG. 1. This further assists in shielding the magnetic circuit from external magnet fields.

Figure 3:
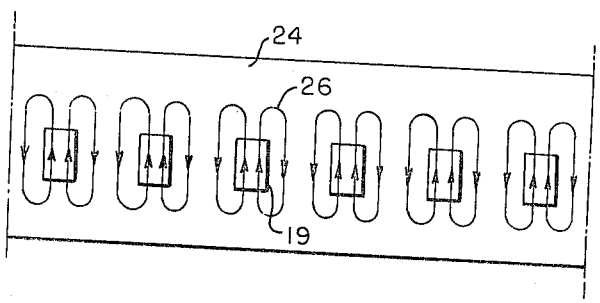
FIG. 3 is a schematic development of the field poles of the magnetic circuit and the conductive element attached to the gyroscope gimbal.

The magnetic lines of force of cylindrical magnet 14, directed through the magnetic gaps by the field poles 19, induce in the conductive element 24 a magnetic field and eddy currents about each of the field poles, the eddy currents being schematically illustrated in FIG. 3 by arrows 26 about the field poles. These eddy currents and concomitant magnetic field in the conductive element 24, or eddy cup, interact with the magnetic field in the gaps 21 to maintain the cylindrical conductive element 24 stationary relative to the field poles 19 and the magnetic field in the magnetic gaps. Any rotation of the conductive element relative to the field poles 19 will be resisted and damped by the interaction of the magnetic field in the magnetic gaps and the eddy currents and magnetic field induced in the conductive element. This interaction in turn exerts a damping force on the gimbal of the gyroscope to which the conductive element is attached, to counteract and damp out any oscillations of the gimbal about its longitudinal rotational axis as defined by the trunnion 5 and the torsion bar 6.

The damping force (D) exerted on the cylindrical conductive element 24 is proportional to the product of the square of the total flux density (B) of the magnetic field in the magnetic gaps 21 and the total outer surface area (A) of the field poles 19; that is:

$$D = B^2 A$$

Therefore, for a total flux produced by the magnet, the damping force is reduced linearly with the pole area but increases with the square of the flux density. Consequently, the maximum damping force is obtained when the cylindrical magnet 14 supports and exerts its maximum flux density in the magnetic gap. The size of the field poles 19 is correlated with the flux density to produce the maximum damping force.

Stated another way, for a given total flux produced by the cylindrical magnet 14, the damping force (D) exerted on the conductive element varies inversely with average outer surface area (A) of the field poles 19 and directly with the square of the number (N) of field poles, that is:

$$D = N^2 / A$$

Thus a multiplicity of field poles 19 is preferred, as shown in FIG. 2.

The damping torque ($T_d$) exerted by the magnetic circuit on the conductive element 24 follows the well known law:

$$T_d = Blvr$$

where B is the flux density in the magnetic gap, $l$ is the effective length of the conductive element in the gap, $v$ is the relative velocity between the conductive element and the field poles, and $r$ is the average radius defined by the magnetic gap, which is substantially the radius of the conductive element.

Physical production of torque is due to the eddy currents and the magnetic field induced in the conductive element 24 by the magnetic field in the gap 21. According to Lenz's law, it is a function of the relative velocity through the field of the conductive element. In the magnetic circuit of the invention, all of the parameters are constant once the magnetic circuit is constructed except for $v$, the relative velocity between conductive element and the field poles. Thus, as the relative velocity between field poles 19 and the conductive element 24 increases the damping torque will increase. The maximum damping torque will be exerted during the maximum oscillations of the gyroscope gimbal 4 about its axis. Preferably, the magnetic circuit is constructed with as large a diameter of the gap 21 as is feasible, and in turn as large a diameter of the conductive element 24 as is feasible. This maximizes the average radius defined by the gap 21 and further maximizes the damping torque.

In operation, rotational movement of the casing 1 relative to the sensitive axis of the rate gyroscope tends to rotate the gimbal 4 about its longitudinal axis. This rotation twists the torsion bar 6, which in turn restricts and limits rotation of the gimbal 4 relative to the casing 1, and exerts a force returning the gimbal to its original position. Upon stabilization of the casing, the gimbal is returned by the torsion bar to its original position. Were there no damping of the movement of the gimbal, it would tend to oscillate for a period of time effectively limited only by the resiliency of the torsion bar. By providing a damping mechanism including the magnetic circuit 13 attached to the outer casing and the cylindrical conductive element 24 attached to the gimbal 4, oscillation of the gimbal is restricted and damped out by the damping force produced by interaction of the magnetic field in magnetic gaps 21 and the eddy currents and magnet field induced in the cylindrical conductive element 24.

In summary, the arrangement of the members which form the magnetic circuit effectively shields the gap in the magnetic circuit from external magnetic fields. Because of this, the damping force exerted by the magnetic circuit is greatly stabilized. Thus, the magnetic circuit provides a highly efficient eddy current type magnetic velocity damping mechanism for delicate and precision instruments, such as a gyroscope, to restrain sudden movement of the members relative to one another and to avoid excessive oscillation of the members. Also, the simplicity of the magnetic circuit both reduces the cost and increases the reliability of the structure.

While a preferred embodiment of the invention has been disclosed, modifications within the purview of the invention will be obvious to those skilled in the art. Accordingly, the invention should not be limited to the details herein set forth, but only by the spirit and scope of the invention as set forth in the appended claims.

I claim:

1. A magnetic circuit comprising a cylindrical magnet, a first magnetically conductive disk-like member having a surface abutting one end portion of the cylindrical magnet, said first disk-like member being larger in diameter than said magnet, an outer magnetically conductive cylindrical member of non-permanent magnet material longer than the cylindrical magnet surrounding and concentric with the cylindrical magnet and the first disk-like member and spaced from the outer periphery of the first annular member to provide a magnetic gap therebetween, and a second magnetically conductive disk-like member abutting the outer cylindrical member and the other end portion of the cylindrical magnet, said outer cylindrical member and said disk-like members constituting a magnetic shield for said cylindrical magnet and said magnetic gap.

2. A magnetic circuit comprising a cylindrical magnet having an axial bore; a first magnetically conductive annular member provided with an axial bore substantially equal to that of said magnet and having a face thereof abutting one end portion of the cylindrical magnet, said first annular member being larger in diameter than said cylindrical magnet; an outer magnetically conductive hollow cylindrical member longer than the combined cylindrical magnet and first annular member surrounding and concentric with the combined cylindrical magnet and first annular member, said outer cylindrical member being spaced from the outer periphery of the first annular member to provide a magnetic gap therebetween; and a second magnetically conductive annular member provided with an axial bore and having a common surface abutting the end of said outer cylindrical member and the other end of said cylindrical magnet, said second annular member being larger in diameter than said cylindrical magnet; the bores of said cylindrical magnet and annular members being coaxial and having substantially the same diameter, and an inner non-magnetic cylindrical sleeve snugly received within said bores with the outer end portions of said sleeve being turned outwardly to overlie and abut the outer faces of said annular members to hold said cylindrical magnet and annular members together as a unitized magnetic circuit assembly.

3. A magnetic circuit as set forth in claim 1 including a plurality of field poles formed on the outer marginal portion of the first disk-like member and extending radially outwardly into said magnetic gap and towards the adjacent surface of the outer cylindrical member.

4. A magnetic circuit assembly comprising an inner cylindrical permanent magnet having an axial bore, a first magnetically conductive annular member having an axial bore substantially equal to the axial bore of the cylindrical magnet and an outer diameter greater than that of said magnet, one face of the first annular member abutting one end of the cylindrical magnet, field poles formed on the outer marginal portion of the first annular member and extending radially outwardly from the annular member, an outer, hollow cylindrical, magnetically conductive member of non-permanent magnet material longer than the cylindrical magnet overlying the cylindrical magnet and the first annular member and spaced from the outer surface of the field poles to provide a plurality of magnetic gaps between said poles and said outer conductive member, a second magnetically conductive annular member attached to the outer cylindrical member and having an axial bore substantially equal to that of the cylindrical magnet and an outer diameter greater than that of said magnet, one face of the second annular member abutting the other end of the cylindrical magnet, and a non-magnetic, cylindrical sleeve snugly received within the bores of said cylindrical magnet and the annular members, the outer end portions of the sleeve extending beyond the outer faces of the annular members and being turned outwardly to overlie and abut said outer faces to hold said annular members and said cylindrical magnet together as a unit.

5. Damping means for an instrument having a stationary element and a rotatable element, comprising the combination of a magnetic circuit composed of generally concentric magnetic members attached to said stationary element and an eddy cup attached to said rotatable element, one of said magnetic members comprising an inner cylindrical magnet, second and third said magnetic members each comprising disk-like members abutting the ends of said cylindrical magnet and being larger in diameter than said magnet, and a fourth of said magnetic members comprising a surrounding cylindrical sleeve of magnetically conductive non-permanent magnet material, one end portion of said sleeve being spaced from the periphery of one of said disk-like members to provide a magnetic gap in the magnetic circuit, said end portion also being extended axially beyond said one disk-like member, the other ends of said sleeve and inner magnet attached to the other of said disk-like members, said cylindrical sleeve and said disk-like members magnetically shielding said air gap and said inner magnet from external magnetic fields, and said eddy cup comprising a cylindrical sleeve extending through said magnetic gap.

6. In a precision instrument having a movable member mounted for rotation relative to an outer casing, a magnetic circuit comprising a cylindrical magnet; a first magnetically conductive annular member having a surface abutting one end portion of the cylindrical magnet and having an outer diameter greater than that of said magnet; an outer magnetically conductive cylindrical member of non-permanent magnet material longer than the combined cylindrical magnet and first annular member surrounding and concentric with the cylindrical magnet and the first annular member, and spaced from the outer periphery of said first annular member to provide a magnetic gap therebetween; a plurality of field poles formed on the outer periphery of said first annular member and extending radially outwardly into said magnetic gap and towards the adjacent surface of the outer cylindrical member; a second magnetically conductive annular member abutting said outer cylindrical member and the other end portion of said cylindrical magnet; and a cylindrical non-magnetic, electrically conductive element attached to said movable member about its rotational axis and extending through said magnetic gap whereby movement of the combined cylindrical electrically conductive element and said rotatable member relative to the magnetic circuit is restricted and damped by the damping force exerted by the magnetic field of said cylindrical magnet in the magnetic gap on said electrically conductive element.

7. In a rate gyroscope having a gimbal mounted for restrained rotation relative to an outer casing, a magnetic circuit comprising an inner cylindrical permanent magnet having an axial bore; a first magnetically conductive annular member having an axial bore substantially equal to the axial bore of the cylindrical magnet, one face of the first annular member abutting one end of the cylindrical magnet; field poles formed on the outer marginal portion of said first annular member and extending radially outwardly therefrom; an outer hollow cylindrical magnetically conductive member of non-permanent magnet material longer than the combined cylindrical magnet and first annular member surrounding said magnet and said first annular member and spaced from the outer surfaces of said field poles to provide a plurality of magnetic gaps between said poles and said outer conductive member; a second magnetically conductive annular member attached to one end of said outer cylindrical member and having an axial bore substantially equal in diameter to that of the cylindrical magnet, one face of the second annular member abutting the other end of the cylindrical magnet; a non-magnetic, cylindrical sleeve snugly received within the bores of said cylindrical magnet and said annular members, the outer end portions of the sleeve extending beyond the outer faces of said annular members and being turned outwardly to overlie and abut said outer faces to hold said annular members and said cylindrical magnet together as a unitized magnetic circuit, said magnetic circuit being attached to the casing coaxial with and about the rotational axis of the gimbal; a cylindrical electrically conductive non-magnetic element attached to the gimbal coaxial with and about the rotational axis thereof and extending through said magnetic gaps whereby movement of the electrically conductive element and the gimbal relative to the casing and said magnetic circuit is restricted and damped by the interaction of the magnetic field in said magnetic gap and the eddy currents and magnetic field induced in said conductive element.

References Cited by the Examiner
UNITED STATES PATENTS

| | | | |
|---|---|---|---|
| 2,770,743 | 11/1956 | Wallach | 310—93 X |
| 2,932,751 | 4/1960 | Crocker et al. | 310—266 X |
| 3,035,238 | 5/1962 | Bouchard et al. | 336—30 |
| 3,079,574 | 2/1963 | Garcia | 336—135 |
| 3,152,275 | 10/1964 | Aske | 310—266 |

ROBERT K. SCHAEFER, *Primary Examiner.*

JOHN F. BURNS, *Examiner.*

D. J. BADER, *Assistant Examiner.*